Feb. 3, 1925.
C. HUTH
PACKING APPARATUS
Original Filed June 2, 1921  6 Sheets-Sheet 1
1,525,035
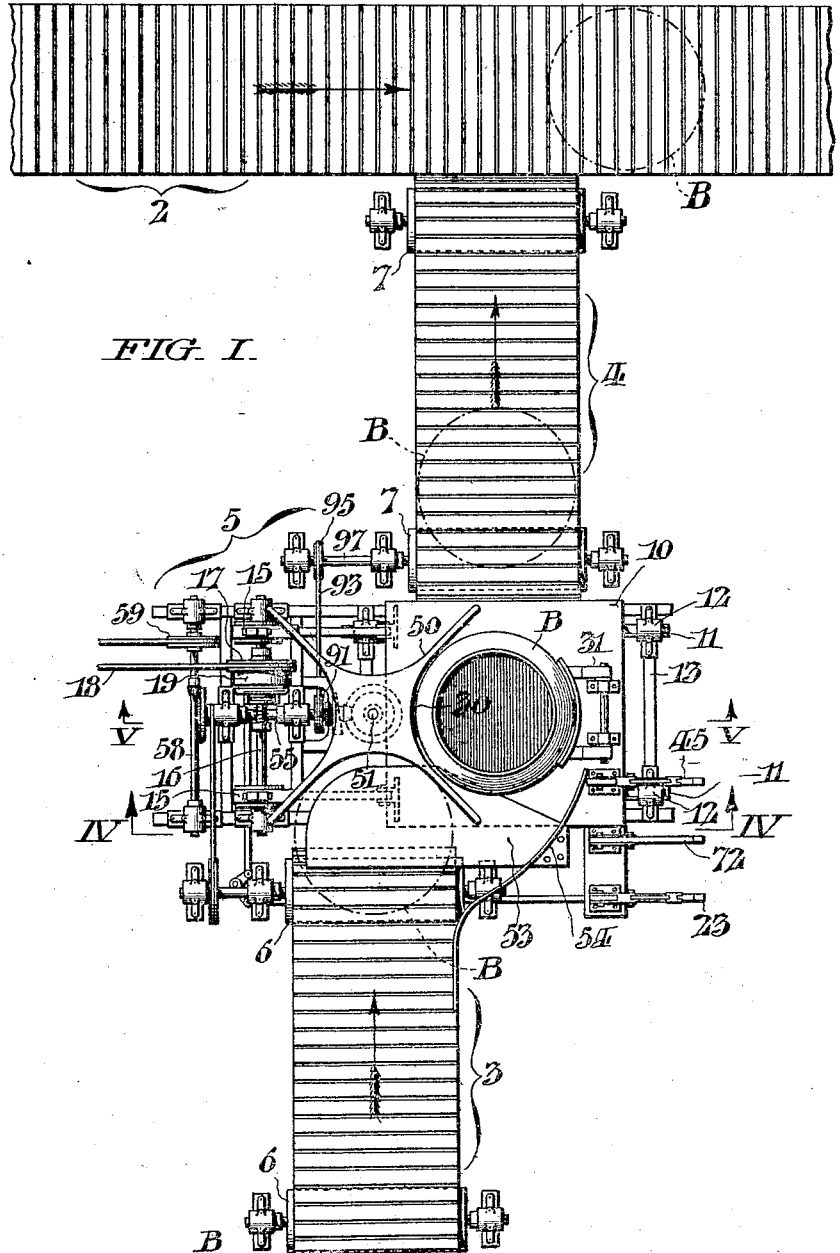
FIG. I.
WITNESSES:
INVENTOR:
Christian Huth,
ATTORNEYS.

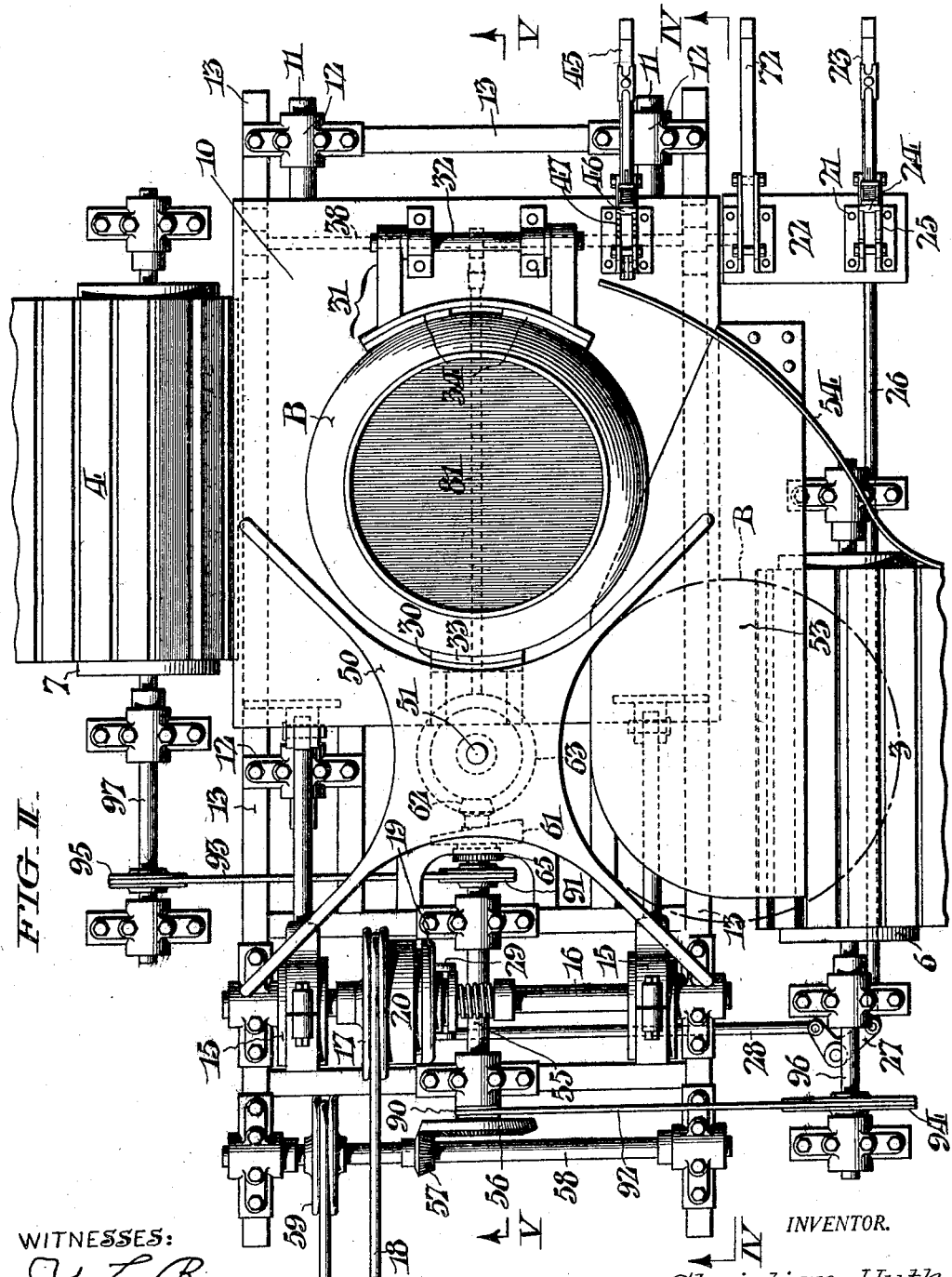

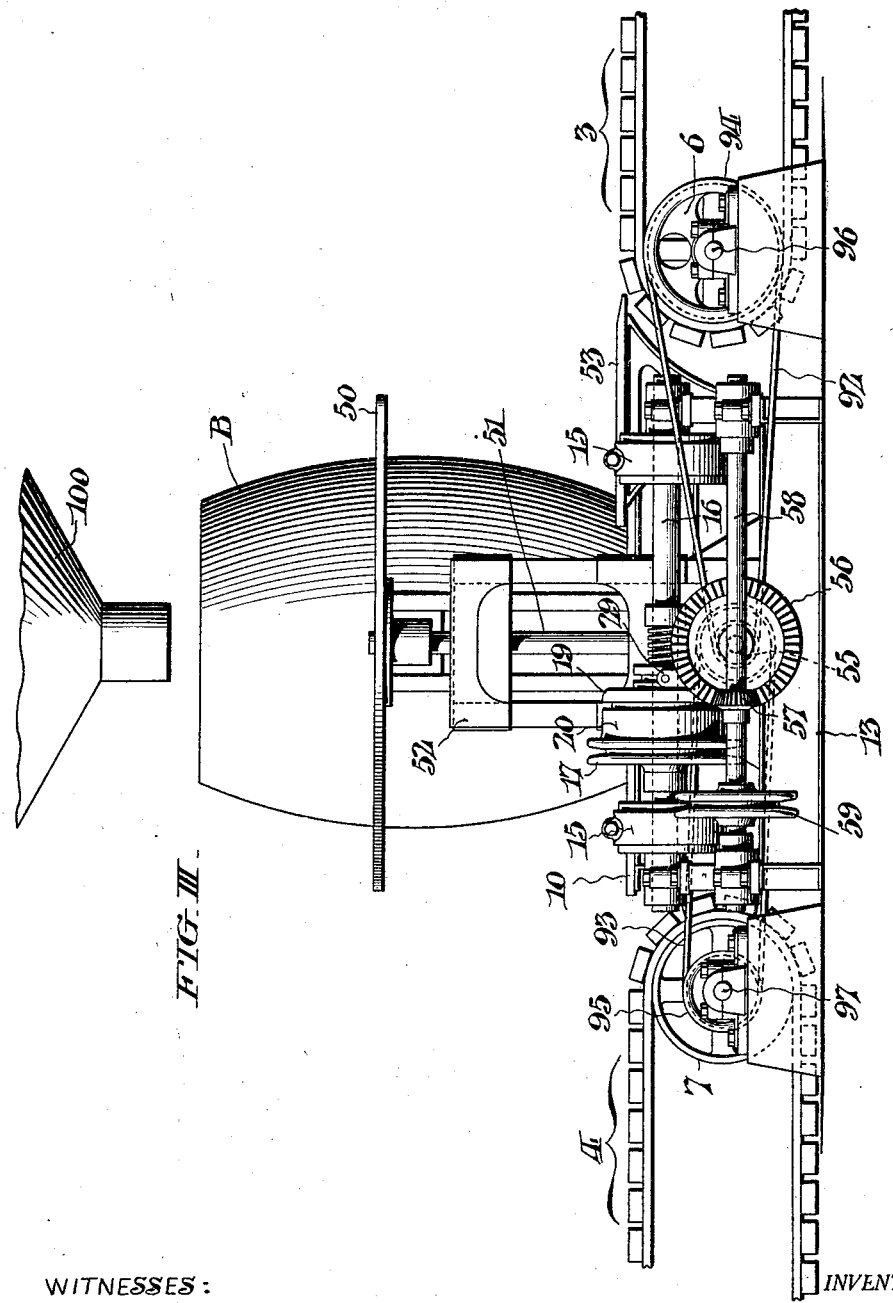

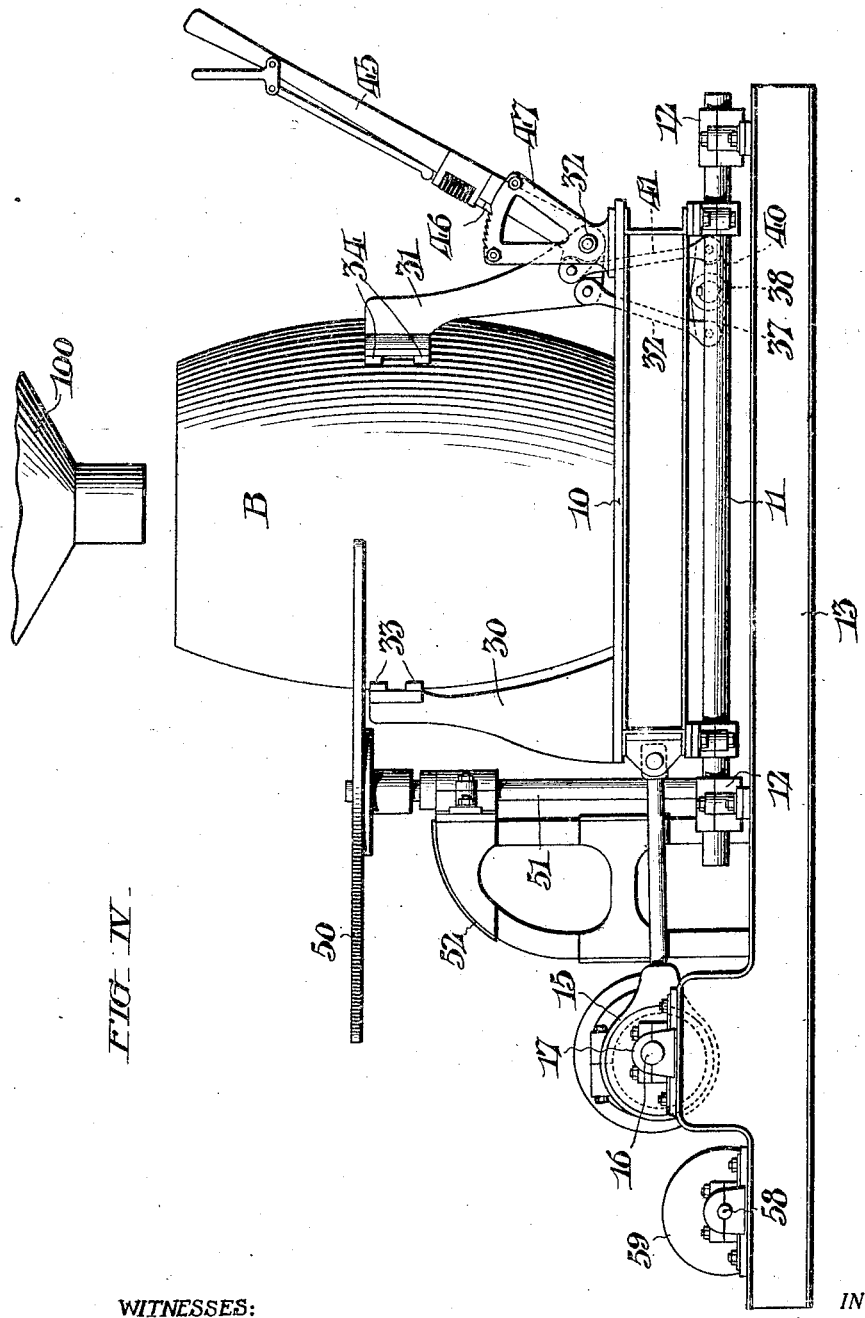

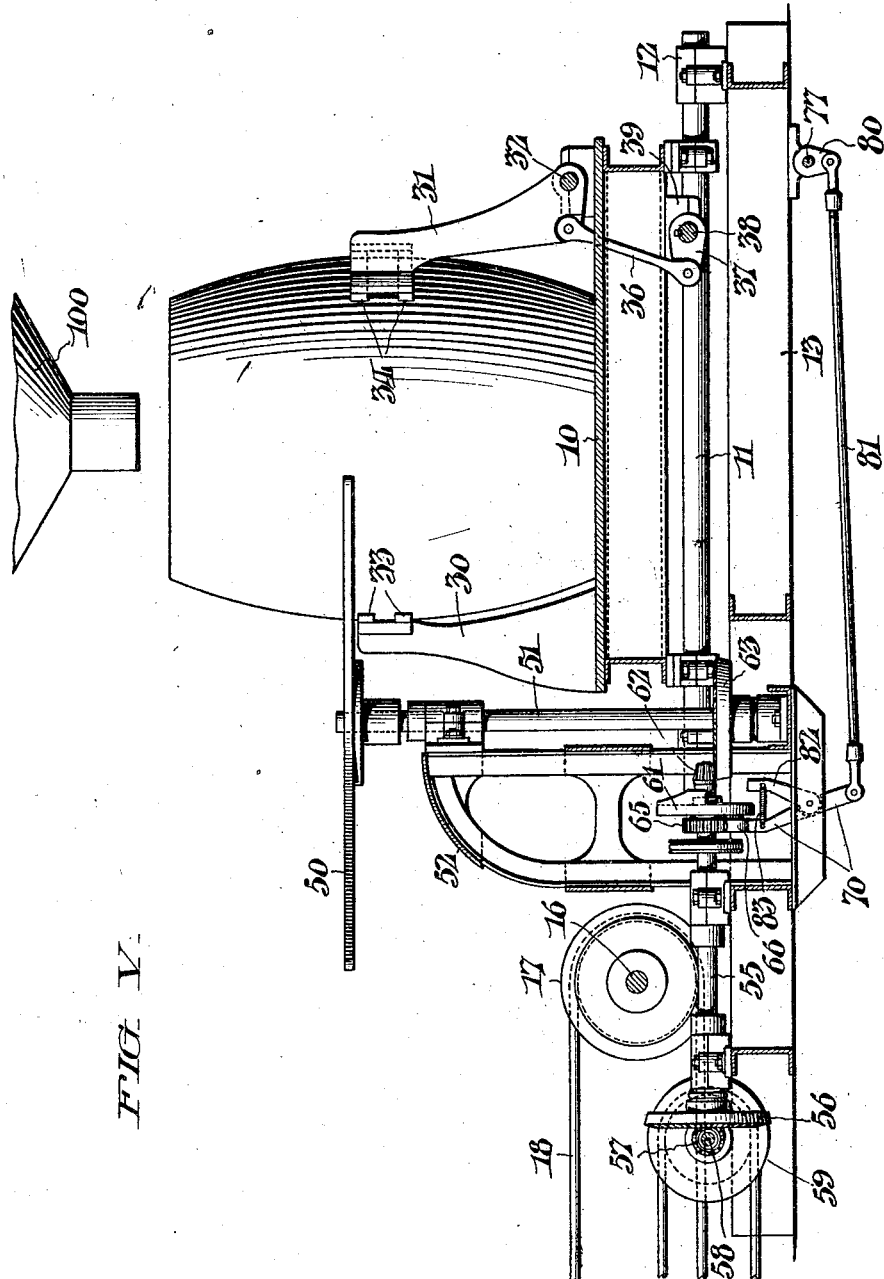

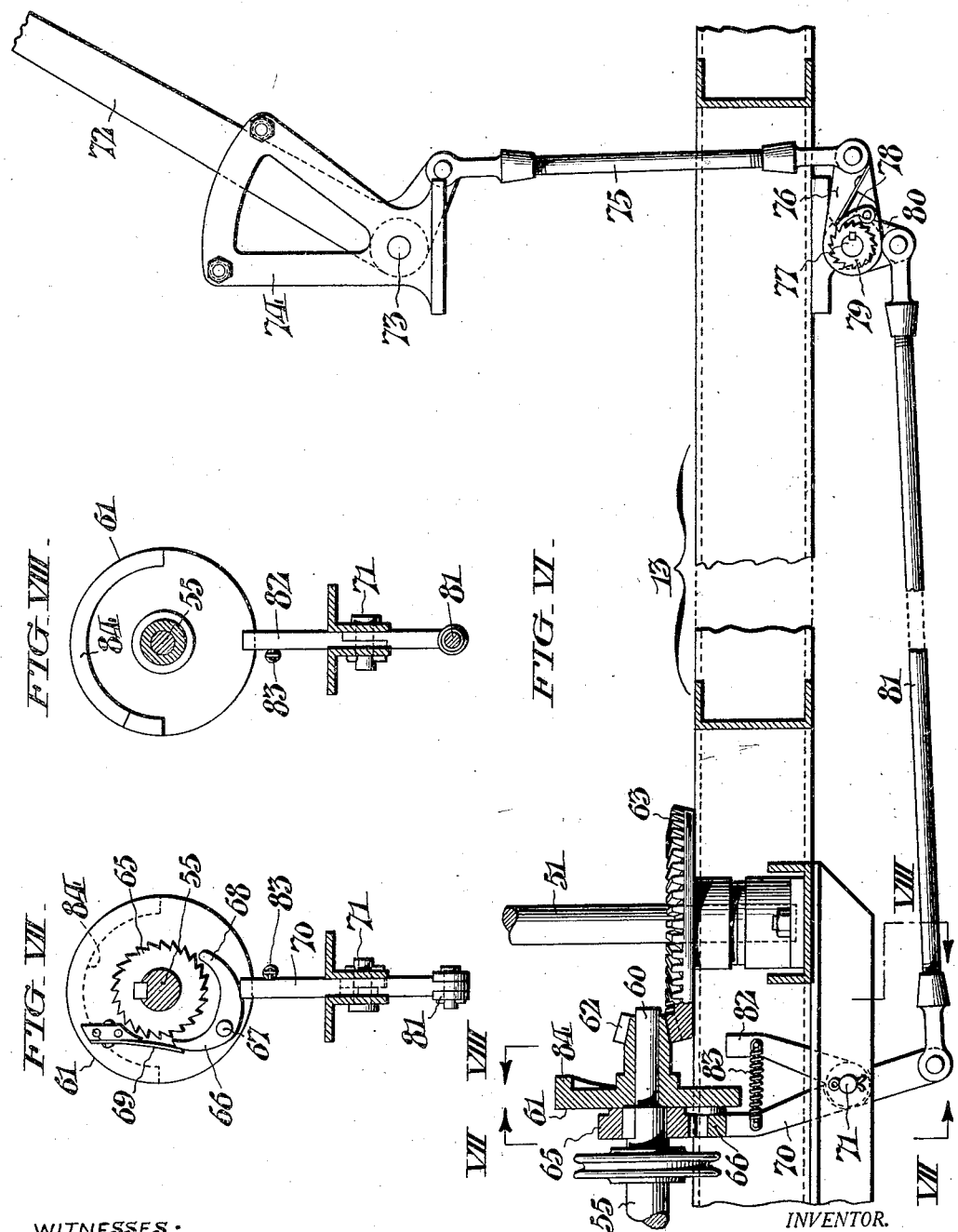

Patented Feb. 3, 1925.

1,525,035

UNITED STATES PATENT OFFICE.

CHRISTIAN HUTH, OF PHILADELPHIA, PENNSYLVANIA.

PACKING APPARATUS.

Application filed June 2, 1921, Serial No. 474,335. Renewed June 26, 1924.

*To all whom it may concern:*

Be it known that I, CHRISTIAN HUTH, a citizen of the United States, residing in Philadelphia, in the county of Philadelphia and State of Pennsylvania, have invented certain new and useful Improvements in Packing Apparatus, whereof the following is a specification, reference being had to the accompanying drawings.

My invention relates generally to packing apparatus and more especially to apparatus useful in packing pulverulent or granular materials, such, for example as sugar, flour, salt, sand, cement, etc., into suitable receptacles or containers for convenient handling in shipping. Close packing of such materials to a high density is greatly facilitated by vibrating the receptacle either during, or after filling. I am aware that this is an old expedient in the art of packing pulverulent or granular materials, but in apparatus heretofore designed for this purpose, especially for packing such materials in comparatively large receptacles or barrels, extremely violent agitation was resorted to, with the result that considerable of the material was expelled as dust. Aside from the consideration of economy, practice under the conditions aforesaid, was not only unsanitary, but, as in the case, for example, of flour, dangerous on account of susceptibility of the liberated particles to explosion.

Amongst the objects of my invention are to obviate the difficulties above pointed out, and to render the packing of pulverulent and granular materials in comparatively large or unwieldly receptacles substantially continuous, so that the work may be economically and expeditiously effected on a large scale.

Other objects and attendant advantages of my invention will become readily apparent from the detailed description which follows.

In the accompanying drawings, Fig. I is an illustration showing in plan, the general lay-out of packing apparatus typical of my invention.

Fig. II is a plan view, on an enlarged scale, of a portion of the apparatus showing more particularly the details of the agitating mechanism.

Fig. III is an elevation of the organization shown in Fig. II, as it appears when viewed from the left of the latter figure.

Fig. IV is an elevation viewed from the lower side of Fig. II, the portions of the apparatus below the plane of the arrows IV—IV having been omitted so as to avoid confusion.

Fig. V is a sectional elevation of the agitating mechanism, the plane of section being indicated by the arrows V—V in Fig. II.

Fig. VI is a fragmentary detail view showing the means whereby the activity of the transfer spider is manually controlled; and Figs. VII and VIII are detail sectional illustrations respectively viewed in the direction of the arrows VII—VII and VIII—VIII in Fig. VI.

Referring first to the complete assembly of Fig. I, I have there shown my invention in a form appropriate for use in a manufacturing establishment of large capacity or output. In order that a great number of receptacles (in this instance barrels B) may be continuously and expeditiously handled, I prefer to provide a conveying system which includes two main, parallelly extending conveyors 1 and 2, and one or more transverse or auxiliary conveyors each comprising two separate sections such as designated at 3 and 4. The main conveyor 1 may be of the ordinary endless type, capable of being actuated under propulsion of any suitable driving means (not shown), and caused to travel, for example, in the direction indicated by the arrow thereon to progress the barrels "B" to position adjacent the transverse conveyor, or conveyors of the system as the case may be. From the main conveyor 1, the barrels "B" are individually transferred, either manually or mechanically to the section 3 of the transversed conveyor, whereby the barrels are, in turn, progressed to a vibrating mechanism comprehensively indicated at 5, shown as being interposed between the said conveyor section and the companion section 4. After having their contents well settled or packed under agitation induced by the vibrating mechanism, the barrels are finally successively transferred to the other main conveyor 2 for delivery to any convenient location or point in the plant for disposal. The transfer of the barrels from the section 4 of the transverse conveyor to the main delivery conveyor 2 may be effected either under manual guidance or automatically, as previously suggested, in connection with transfer between the main conveyor 1 and the section 3 of said transverse conveyor. The two sections of the transverse conveyor are driven in the same direction as indicated by the arrows in Figs. I and II, under support of drums 6, 6 and 7, 7 respectively, in a manner to be later disclosed herein.

Coming now to the vibrating mechanism 5 shown in greater detail in Figs. II to V inclusive, it will be noted that this mechanism includes a table 10 preferably of a size capable of conveniently accommodating the barrels "B" one at a time. Said table may be of any approved construction and is herein shown as rigidly mounted to slide bars 11, 11 which are guided for horizontal reciprocation in appropriate bearings 12, 12 supported by an underlying frame 13. Vibratory motion is imparted to the table 10 through the aid of eccentrics 15, 15 on a shaft 16, the latter being journalled in bearings 17 supported by the frame 13 aforesaid. In practice, the shaft 16 is driven at such speed as to cause vibration of the table, through interposed instrumentalities just described, at a suitable rate to effect thorough settling of the contents of the barrel thereon, but without so unduly agitating the contents as to result in forcible expulsion of any dust when comparatively fine material such as cement, or flour, is being packed. The shaft 16 has loosely mounted thereon a pulley 17 which is coordinated with a suitable source of power (not shown) through a belt 18. A clutch collar 19 keyed to the shaft, with capacity for limited longitudinal motion, is adapted for cooperation within a companion clutch member 20 integrally formed at one side of the pulley 17. Shifting of the clutch in starting and stopping the vibration of the table 10 may be effected manually through the following means:

Fulcrumed to a sector bracket 21 supported upon a block 22 adjacent the frame 13 (shown at the lower right hand portion of Fig. II) is a hand lever 23 which may be set in any desired position by engaging a latch 24 thereon with the teeth 25 of the sector bracket. Said lever 23 is coupled by means of a rod 26 with a motion-translating bell crank lever which is in turn coupled, through a rod 28, with a forked actuating arm 29 for the clutch collar 19.

In order to prevent displacement of the barrel "B" during the vibrating of table 10, said barrel is rigidly held between clamp members 30 and 31, of which the former is fixed to said table, while the latter is swingable about the axis of a rock shaft 32 whereto it is secured. The clamp members 30 and 31 respectively support, at their upper ends, arcuate segments 33 and 34 having a curvature conforming to that of the bulged portions of the barrels. The clamp member 31 is coupled, by means of a link rod 36, with a crank arm 37 fixed to a shaft 38 suitably supported in bearings 39 at the bottom of the table, see Fig. V. As best shown in Fig. IV, the shaft 38 carries a second crank arm 40, in turn connected by means of a link rod 41 with a hand lever 45. In order that the hand lever may be locked to hold the clamp member 31 in active position, said lever carries a shiftable latch 46 which cooperates with the teeth of a sector 47. The various lever elements of the clamping device just described are so proportioned that considerable pressure may be applied in securing the barrel to the table without necessitating undue exertion on the part of the operative.

The barrels progressed to the table 10 by the section 3 of the transverse conveyor, come to rest successively in the bights between the radial arms of an intermittently operative transfer spider 50 while temporarily sustained upon a platform 53 which overhangs the terminal end of the conveyor section 3 and also a portion of the table 10. The spider 50 is secured to a vertical shaft rotatively supported in an upright standard 52, rising from the frame 13, and is adapted to be moved through a quadrant at each actuation to transfer a barrel from the platform 53 to a central position on the table as suggested in Figs. I and II. In the course of such shifting, the barrel is held against being displaced from between the arms of the spider by a cooperative stationary arcuate guide plate 54 secured to said platform.

The mechanism whereby the spider is actuated and whereby intermittent movement thereof may be manually controlled includes a constantly rotating shaft 55 which receives its motion through bevel gears 56, 57 from a main driving shaft 58. Said shaft has secured thereto a pulley 59 adapted for belt connection with any appropriate source of power. The shafts 55 and 58 are both supported in bearings secured to the frame 13 as clearly shown in the several figures of the drawings. The inner end of the shaft 55 is reduced as indicated at 60 in Fig. VI, for the mounting of a freely rotatable cam disk 61 which has either fixedly attached to it, or formed as an integral part thereof, a beveled pinion 62. Said pinion meshes with a gear 63 secured to the lower end of the vertical shaft 51 which carries the spider. The gear ratio is such that the spider 50 is shifted through a quadrant for each rotation of the shaft 55. Keyed to the shaft 55 directly adjacent the cam disk 61 is a ratchet wheel 65 which, when the spider is to be shifted, is engaged by a pawl 66 fulcrumed about a pivot 67 on the outer face of the cam disk 61. Said pawl has a curved tail 68 which is normally arrested in the position shown in Fig. VII in opposition to the pressure of a leaf spring 69, by the upper end of a stop finger 70 so as to hold the said pawl inactive. The stop finger 70 (see Fig. VI) is fulcrumed about a fixed pivot 71 and, when swung in a counterclockwise direction, moves from beneath the tail 68 of the pawl and allows the latter to shift under the action of the spring 69 into engagement with the teeth of the ratchet wheel 65, as a result of which the cam 61 and pinion 62 are obliged to follow the rotative movement of the latter, thus bringing about actuation of the spider. Shifting of the stop finger 70 is effected through the instrumentality of a hand lever 72 located adjacent the hand lever 23 previously described, and fulcrumed about a pivot 73 supported in a bracket 74 on the block 22. The lever 72 is coupled, by means of a link 75, with an arm 76 mounted for free movement about a shaft 77. The arm 76 carries a spring pressed pawl 78 adapted for cooperation with a ratchet 79 fixed to the shaft 77, so that motion is imparted to the latter when the hand lever 72 is swung to the left as considered in connection with Fig. VI. The motion thus imparted the shaft 77 is transmitted, through a lever arm 80 and a coupling rod 81, to the stop finger 70.

In order to effect automatic return of the finger 70 to its normal position to bring about disengagement of the pawl 66 from the ratchet wheel 65, after shaft 55 has made a complete revolution, provisions have been made as follows:

Mounted upon the fulcrum shaft 71 is an auxiliary finger 82 which is adapted to move with the finger 70 but capable of yielding with respect to the latter to allow of a limited amount of lost motion under tension of a connecting spring 83. Said spring serves to absorb any excess motion which may be imparted to the stop finger 70, as the hand lever 72 is shifted, and thus acts in a protective capacity to prevent injury to the stop mechanism. When the stop finger 70 is shifted as aforesaid, the auxiliary finger 82, in following, will be advanced into the path of an edge cam 84 of the disk 61, and, during rotation of the latter, shifted to bring the stop finger 70 into the path of the tail 68 of the ratchet 66. From Figs. VII and VIII, it will be noted that the arcuate extent of the edge cam 84 is such that a gradual movement will be imparted to the auxiliary finger 82, so that strain on the mechanism is reduced to a minimum. By reason of the provision of the pawl and ratchet connection for the lever 76, the stop finger 70 is left free to be returned to its normal position, as above described, regardless of the position of the hand lever 72.

From Fig. I, it will be clearly obvious that when a new barrel is transferred from the platform 53 to the table 10, the barrel, which previously occupied the table is, at the same time, transferred to the section 4 of the transverse conveyor for progression to the main delivery conveyor 2, as previously suggested.

As a convenient means for driving the sections 3 and 4 of the auxiliary conveyor, I have provided pulleys 90 and 91 which are respectively secured to the shaft 55, and coordinated through belts 92 and 93 with pulleys 94 and 95 on the shafts 96 and 97 of the drive drums 6 and 7 of said conveyor sections.

As suggested at the beginning of this description, the barrels may be transferred either manually or mechanically from the main conveyor 1 to the section 3 of the transverse conveyor, and from the section 4 of the transverse conveyor to the main delivery conveyor 2. In the latter instances, transfer devices, such as the spider 50 and the associated controlling means, may be provided for this purpose.

In actual practice, I prefer to fill the barrels while supported upon the vibrating table 10, and this may be readily accomplished through aid of an overhead spouted bin or hopper, such as shown at 100 in several of the figures of the drawings. Constant agitation in the course of filling will obviously result in closer packing of the material in the receptacles with the further advantage of a gain in time over that which would be necessary if these operations were carried on separately.

Having thus described my invention, I claim:

1. A packing apparatus of the character described, comprising a vibrating table adapted to support receptacles which are to have their contents agitated to effect close packing; conveyor means for progressing receptacles to the vibrating table; conveyor means for conducting the receptacles away from said table; and an intermittently rotating spider for transferring the receptacles from the first mentioned conveyor to the vibrating table and thence to the other of said conveyors.

2. A packing apparatus of the character described, comprising a vibrating table adapted to support receptacles which are to have their contents agitated to effect close packing; conveyor means for progressing receptacles to said table; an intermittently operable means for transferring the receptacles from the conveyor to the table; and means whereby the activity of the transferring means may be manually controlled.

3. A packing apparatus of the character described, comprising a vibrating table adapted to support receptacles which are to have their contents agitated to effect close packing; conveyor means for progressing receptacles to said table; an intermittently operable means for transferring the receptacles from the conveyor to the table; and spider for driving the spider, said spider having capacity, after being manually started, of becoming automatically inactive after each actuation of the transfer means.

4. A packing apparatus of the character described, including a conveying system comprising a pair of main conveyors extending in parallelism; auxiliary conveyors extending transversely between said main conveyors, in combination with a vibrating table, associated with each auxiliary conveyor and whereto receptacles, in transit, are temporarily transferred for the purpose of agitating their contents to effect close packing.

5. A packing apparatus of the character described, comprising a vibrating table adapted to support receptacles which are to have their contents agitated to effect close packing; a conveyor for progressing receptacles to said table; and an intermittently operable, multi-armed spider for transferring receptacles from the conveyor to the table; in combination with actuating means for the spider including a continuously rotating driving shaft; and clutch means capable, after being manually started, of becoming automatically inoperative upon completion of each actuation of the spider comprising a ratchet wheel fixed to the aforesaid driving shaft; a disk loosely mounted to said shaft adjacent said ratchet wheel, said disk being geared to the axis of the spider; a spring pressed pawl carried by the disk and adapted for cooperation with the ratchet wheel; a stop adapted to engage the pawl to normally maintain the same retracted from the ratchet wheel; and a hand lever for shifting the stop to release the pawl; and a segmental edge cam on the aforesaid disk for automatically restoring the stop to its normal position after the shaft has turned sufficiently to effect shifting of the spider.

6. A packing apparatus of the character described, comprising a vibrating table capable of supporting receptacles which are to have their contents agitated to effect close packing; means for temporarily securing said receptacles to the table including a fixed clamp member; a cooperative movable clamp member; a hand lever; and an interposed leverage system whereby the movable clamp member may be shifted in engagement with the receptacle under the actuation of said hand lever.

7. A packing apparatus of the character described comprising a table having capacity for rapid vibration, conveyors for moving receptacles toward and away from the table, means for transferring receptacles from one conveyor to the table and from the table to the other conveyor, means for clamping each receptacle in fixed relation to the table, and a series of mutually adjacent manual controls for alternately operating the conveyors and the transferring means, and for clamping and releasing the receptacles while resting upon and prior to removal from the table.

8. In a packing apparatus, a vibrating table, a conveyor to deliver receptacles to the table, a stationary platform interposed between the conveyor and table to temporarily receive the receptacles during transition from conveyor to table, and means to transfer the receptacles from the platform to the table.

9. In a packing apparatus, a vibrating table, a conveyor to deliver receptacles to the table, and an intermittently movable element to engage and transfer receptacles from the delivery end of the conveyor to the table.

10. In a packing apparatus, a vibrating table, conveyors to deliver and withdraw receptacles to and from the table, means to transfer the receptacles from the conveyors to the table and vice versa, and connections between the conveyors and transfer means to ensure simultaneous progression of the receptacles.

11. In a packing apparatus, a vibrating table, conveyors to deliver and withdraw receptacles to and from the table, means to transfer the receptacles from the conveyors to the table and vice versa, means to drive the transferring means, operative connections between the transferring means and conveyors for operation in unison, manual means to initiate operation of the transferring means, and means to automatically discontinue operation thereof after an interval of operation.

12. In a packing apparatus, conveyors, a vibrating table, means to transfer receptacles between the conveyors and table including a rotatable receptacle engaging member, a continuously rotating driving means, a clutch means manually operable to connect said driving means to the receptacle engaging member, and means operable automatically to break the clutch means after an interval of operation.

13. In a packing apparatus, a receptacle transferring means including a rotatable receptacle engaging member, a continuously operating shaft, a loose gear connection therebetween, a disc movable with one gear, pawl and ratchet members carried by the disc and shaft, manual means to couple the pawl and ratchet, and a cam and cooperating means carried by the disc to uncouple the pawl and ratchet automatically after an interval of operation.

In testimony whereof, I have hereunto signed my name at Philadelphia, Pennsylvania, this 24th day of May, 1921.

CHRISTIAN HUTH.

Witnesses:
JAMES H. BELL,
E. Z. FULLERTON.